United States Patent [19]

Fang

[11] Patent Number: 6,096,215

[45] Date of Patent: Aug. 1, 2000

[54] LIQUID BIO-NUTRIENTS FOR USE IN BIOLOGICAL WASTEWATER TREATMENT PROCESSES AND METHOD FOR USING THEM

[75] Inventor: Albert Yi-Hung Fang, Douglasville, Ga.

[73] Assignee: Fang Chemicals, Inc., Carrolton, Ga.

[21] Appl. No.: 09/339,827

[22] Filed: Jun. 25, 1999

[51] Int. Cl.$^7$ .................................................. C02F 3/00
[52] U.S. Cl. .................. 210/610; 210/614; 210/631; 210/928; 252/181
[58] Field of Search .................................. 210/610, 611, 210/614, 631, 739, 928; 252/180, 181; 435/277, 278; 424/605, 604, 682

[56] References Cited

U.S. PATENT DOCUMENTS

| | | | |
|---|---|---|---|
| 3,711,392 | 1/1973 | Metzger | 210/611 |
| 3,796,543 | 3/1974 | Kamphake | 23/230 R |
| 3,961,078 | 6/1976 | Stitt | 210/610 |
| 4,986,916 | 1/1991 | Hickey | 210/614 |
| 5,076,928 | 12/1991 | Ballnus | 210/614 |
| 5,411,889 | 5/1995 | Hoots et al. | 436/6 |
| 5,626,754 | 5/1997 | Ballnus | 210/610 |
| 5,747,342 | 5/1998 | Zupanovich | 210/743 |
| 5,885,950 | 2/1999 | Dale et al. | 210/610 |
| 5,958,241 | 9/1999 | DeBenedetto et al. | 210/611 |
| 5,976,375 | 11/1999 | Dorica et al. | 210/610 |

OTHER PUBLICATIONS

Wastewater Biology: The Life Processes, p. 15–64, a special publication prepared by Task Force on Wastewater Biology: The Life Processes under the direction of the Operations and Maintenance Subcommittee of the Technical Practice Committee, p. cm., ISBN 1–881369–93–5, copyright 1994 by the Water Environment Federation, Alexandria, VA 22314–1994 USA.

*Primary Examiner*—Thomas G. Wyse
*Attorney, Agent, or Firm*—Finnegan, Henderson, Farabow, Garrett & Dunner

[57] ABSTRACT

A composition for treating nutrient deficient wastewater from a paper-making process, which eliminates the use of conventional treatments and efficiently provides essential nutrients for biologically degrading organic pollutants, comprising urea and phosphoric acid. A method for treating nitrogen and phosphorus deficient wastewater with a treatment composition of urea and phosphoric acid in varying concentrations depending on the nitrogen and phosphorus content of the wastewater.

22 Claims, No Drawings

LIQUID BIO-NUTRIENTS FOR USE IN BIOLOGICAL WASTEWATER TREATMENT PROCESSES AND METHOD FOR USING THEM

FIELD OF THE INVENTION

The present invention relates to nutrient supplements used in biological wastewater treatment processes. More particularly, the present invention relates to a composition for treatment of industrial wastewaters with deficient nitrogen and phosphorus content. The present invention is particularly useful for treating wastewater generated by the pulp and paper industry.

BACKGROUND OF THE INVENTION

Most industrial processes produce wastewater which must be treated to remove contaminants prior to discharge into surrounding rivers, lakes and streams. Several physical, chemical and biological processes exist for treating and controlling the level of various contaminants in wastewater effluents. One of the most common methods for removing biochemical oxygen demand (BOD), a common expression for the degree of organic pollutants in the wastewater, is the aerobic activated sludge process. In this process, untreated wastewater is introduced into a suspension of microorganisms, primarily bacteria, where the BOD is metabolically oxidized. After a sufficient retention time under aerobic conditions, the wastewater enters a clarifier or sedimentation basin where the biomass separates as settled sludge from the liquid and the treated wastewater is discharged into receiving waters.

In order to remove organic pollutants from the wastewater efficiently, microorganisms (bacteria) must have a growth environment with adequate nutrients. Nutrients are chemical elements required by a cell (microorganism) for it to live and reproduce. Major nutrients necessary for the synthesis of new cells are carbon, oxygen, hydrogen, nitrogen, sulfur, phosphorus, potassium, magnesium, calcium, iron, sodium and chlorine. However, industrial wastewaters, especially those generated by pulp and paper mills, often lack sufficient nitrogen and phosphorus to promote cell synthesis. For this reason, nitrogen and phosphorus are frequently referred to as the essential or limiting nutrients for biological wastewater treatment processes.

Accordingly, industry typically controls nitrogen and phosphorus levels in biologically treated wastewater to promote growth of microorganisms which breakdown organic pollutants. Anhydrous ammonia ($NH_3$) or aqua ammonium ($NH_4OH$) are the most common nitrogen supplements used as they are the most economical and readily usable forms of nitrogen. When anhydrous ammonia or aqua ammonia is used as a nitrogen supplement, wastewater operators generally monitor the effluent ammonia concentration as a control parameter for ammonia addition. To ensure adequate ammonia in the wastewater aeration tank most operators keep the ammonia effluent concentration at 1.5 mg/L or higher. However, because the ammonia concentration of the effluent does not reflect the amount of nitrogen available from organic nitrogenous compounds, nitrate ($NO_3$) or nitrite ($NO_2$) contained in the wastewater, monitoring only the ammonia level often results in excess nitrogen addition to the wastewater. Excess nitrogen in the discharged wastewater may lead to excessive plant growth and algae blooms which cause bad taste, bad odor, dissolved oxygen (DO) depletion, and fish kills. Because of the eutrophication of our lakes and rivers there is a tremendous demand for nutrient control in the wastewater treatment plants throughout our land.

To prevent excess addition of nitrogen into the wastewater, operators should monitor the Kjeldahl Nitrogen (TKN) concentration of the wastewater and utilize the TKN as a control parameter for ammonia addition. TKN represents the total amount of ammonia-N and organic-N contained in the wastewater. Although utilizing TKN as the control parameter reduces excess nitrogen in the discharged water, the TKN test is very time consuming and difficult for wastewater operators to run. Therefore, the TKN is rarely used by wastewater operators as a control parameter for ammonia addition.

Supplemental phosphorus is typically added to the wastewater by charging phosphoric acid. Like the nitrogen addition, wastewater operators often add excess phosphoric acid to the wastewater to ensure adequate phosphorus for biosynthesis. Phosphoric acid is the preferred phosphorus supplement because most organisms can assimilate and directly use ortho-phosphate (ortho-p) for cell growth. Typically, wastewater operators maintain a minimum ortho-p concentration in the effluent of 0.5 mg/L to ensure that the phosphorus requirements of the microorganisms are satisfied.

Paper mills sometimes use ammonium poly-phosphates (liquid fertilizers) as a source of phosphorus for wastewater treatment. However, poly-phosphates must be converted to ortho-phosphates before they can be used in biosynthesis. Accordingly, use of poly-phosphates often results in excessive phosphorus in the final effluent due to the slow conversion of poly-phosphates to ortho-phosphates. This slow conversion makes controlling the ortho-phosphate concentration level of the effluent difficult often resulting in over charges of poly-phosphates and excess phosphorus in the effluent.

In addition to the problems associated with the excessive addition of nitrogen and phosphorus caused by current industry practices and methods, wastewater treatment operators are plagued by other inefficiencies. Most notably, anhydrous ammonia, while an adequate nitrogen source, has many operational disadvantages. For example, air emissions of ammonia are significant, especially in intensively mixed and aerated wastewater systems, as ammonia vaporizes when added to wastewater in excess. Further, the presence of excess ammonia in the wastewater system promotes nitrification in the aeration system as ammonia is oxidized and converted to nitrate. This nitrification exerts an extra oxygen demand on the wastewater system. Still further, excessive nitrification leads to high levels of nitrate in the secondary clarifier and settling pond which leads to denitrification, a process which generates gas and adversely affects the sludge settling process. In addition, the industry incurs substantial costs associated in complying with increasingly oppressive health and environmental regulations targeting the use and storage of anhydrous ammonia.

The present invention eliminates the use of ammonia, provides an efficient means for supplementing nitrogen and phosphorus, and ensures adequate availability of nutrients for sustained biosynthesis of microorganisms which promote the breakdown of organic pollutants while minimizing the discharge of excess eutrophication causing nutrients common in existing wastewater treatment operations.

SUMMARY OF THE INVENTION

Further advantages of the invention will be set forth in part in the description which follows and in part will be apparent from the description, or may be learned by practice of the invention. The advantages of the invention may be realized and attained by means of the instrumentalities and combinations particularly pointed out in the appended claims.

To achieve the foregoing advantages and in accordance with the purpose of the invention, as embodied and broadly described herein, there is disclosed:

A composition for treating an organic pollutant containing, nutrient deficient wastewater from a paper-making process to provide essential nutrients for biologically degrading the organic pollutant comprising:

urea, phosphoric acid with less than 1.0% by weight aluminum; and water.

There is further disclosed:

A method for treating an organic pollutant containing, nutrient deficient wastewater from a paper-making process to provide essential nutrients for biologically degrading the organic pollutant comprising:

determining the deficient nutrient ratio, formulating a treatment composition containing urea and phosphoric acid in amounts such that the nitrogen and phosphorus content of the composition approximates the deficient nutrient ratio.

DESCRIPTION OF THE INVENTION

The present invention includes a series of formulated liquid nutrients containing both nitrogen (N) and phosphorus (P) in a variety of nitrogen to phosphorus ratios (N:P) for use in wastewater streams of varying compositions. The present invention is also directed at a method for utilizing the composition to effectively and efficiently treat nitrogen and phosphorus deficient wastewater containing organic pollutants.

The compositions of the present invention include mixtures of urea, phosphoric acid and water. These compositions provide a more effective and efficient source of nitrogen and phosphorus and can be used as a replacement for traditional nutrient supplements such as separate addition of anhydrous ammonia and phosphoric acid. The compositions are totally soluble in water, their nutrient values are easily utilizable by bacteria, and they can be handled and stored without incurring the ammonia smell associated with use of anhydrous ammonia.

Urea provides a safer, more effective and less environmentally harmful nutrient supplement than anhydrous ammonia. Urea, $(NH_2)_2CO$, is an organic nitrogenous compound containing 46% N. Urea is made by reaction of ammonia, $NH_3$, and carbon dioxide, $CO_2$ and is available in several grades including commercial, technical, feed, industrial and fertilizer grade urea. Any grade of urea is suitable for use in the claimed invention. As such, the least expensive grade urea, generally fertilizer grade, is preferred. Urea is typically available in crystal or powder form and it readily dissolves in water.

Those skilled in the art generally discouraged use of urea as a nutrient supplement believing that urea, as an organic nitrogenous compound, imparted an additional organic load on the wastewater system. However, when urea is introduced into a microorganism containing wastewater, urea rapidly hydrolyzes to ammonia-N, $—NH_2$, and releases $CO_2$ as a gas—imparting no additional organic load on the wastewater system.

An additional advantageous characteristic of urea is that it does not convert to ammonia-N until needed for biosynthesis by a microorganism. When urea converts to ammonia-N it is rapidly assimilated by microorganisms. This "time release nutrient" property makes urea an ideal replacement for ammonia because it drastically reduces the residual amount of ammonia left in the wastewater.

While a simple urea solution, e.g. 40% urea and 60% water, can be used to replace ammonia as a nitrogen supplement, use of a simple urea solution creates additional operational problems. For example, because use of urea eliminates residual ammonia in the wastewater effluent, operators must utilize the TKN concentration as the control parameter for urea addition. As previously disclosed, the difficult and time consuming nature of the TKN test prohibits its long-term application as a basis for controlling the nitrogen content of the wastewater effluent. Accordingly, use of a simple urea solution as a nutrient supplement does not provide a practical alternative to anhydrous or aqua ammonia.

However, in addition to dissolving in water, urea also readily dissolves in phosphoric acid solutions. The wide solubility range of urea in phosphoric acid solutions allows creation of compositions with varying nitrogen to phosphorus ratios which can be used to provide a balanced addition of nutrients to most wastewater streams. Any combination of urea and phosphoric acid can be blended to accommodate the nutrient deficiencies of any given industrial wastewater. For exemplary purposes only, mixtures of urea and phosphoric acid with N to P ratios of 10:1 to 1:10, which may be commonly encountered in the industry, are depicted in Table I.

TABLE I

| | | Mixtures Of | | |
| --- | --- | --- | --- | --- |
| N/P | Bio-Nutrient | Urea (46% N) | 75% $H_3PO_4$ | Water |
| 10/1 | 23% N, 2.3% P | 50 | 9.7 | 40.3 |
| 5/1 | 18.4% N, 3.7% P | 40 | 15.5 | 44.5 |
| 2/1 | 13.8% N, 6.9% P | 30 | 29.1 | 40.9 |
| 1/1 | 9.2% N, 9.2% P | 20 | 38.8 | 41.2 |
| 1/2 | 4.6% N, 9.2% P | 10 | 38.8 | 51.2 |
| 1/5 | 2.3% N, 11.5% P | 5 | 48.5 | 46.5 |
| 1/10 | 1.5% N, 15% P | 3.3 | 63.2 | 33.5 |

The above mixtures are clear solutions at ambient temperature. While compositions with N to P ratios of 10:1 to 1:10, nitrogen content of 1.5–23%, and phosphorus content of 2.3–15% are disclosed for illustrative purposes, mixtures of higher or lower concentrations may be created for any given ratio as illustrated in Table II. However, to create mixtures with N to P concentrations greater than the mixtures illustrated in Table I, heat is required to keep urea in solution from salting out at ambient or lower temperatures. For operational efficiency purposes, the highest concentration achievable without encountering solubility problems, e.g. the concentrations illustrated in Table I, should be used to obtain the desired nutrient ratio.

TABLE II

| | | Mixtures Of | | |
|---|---|---|---|---|
| N/P | Bio-Nutrient | Urea (46% N) | 75% $H_3PO_4$ | Water |
| 10/1 | 25% N, 2.5% P | 54.3* | 10.5 | 35.2 |
| 10/1 | 23% N, 2.3% P | 50 | 9.7 | 40.3 |
| 10/1 | 21% N, 2.1% P | 45.7 | 8.9 | 45.4 |
| 10/1 | 19% N, 1.9% P | 41.3 | 8.0 | 50.7 |
| 10/1 | 15% N, 1.5% P | 32.6 | 6.3 | 61.1 |
| 10/1 | 10% N, 1.0% P | 21.7 | 4.2 | 74.1 |
| 10/1 | 5% N, 0.5% P | 10.9 | 2.1 | 87.0 |

*Heat is required to keep urea in solution from salting out at ambient temperature.

Operational efficiencies are achieved by tailoring the composition of the mixture to the amount of nitrogen and phosphorus already contained in the wastewater. Nitrogen and phosphorus are the limiting nutrients for most biological wastewater treatment processes and as such must be added to the wastewater to ensure maximum biosynthesis of the organic pollutants. By accounting for the nitrogen and phosphorus already present in the wastewater, sufficient nitrogen and phosphorus may be added without the overcharging of nutrients which occurs in current wastewater treatment operations.

Any phosphoric acid of reasonable purity may be used to form the claimed composition. The manufacturing process used to produce a given phosphoric acid determines its type. There are three broad types of phosphoric acid: Thermal Phosphoric Acid (TPA) (produced by combustion of elemental phosphorus and subsequent hydration), Wet Phosphoric Acid (WPA) (produced by reacting phosphate rock and sulfuric acid), and Purified Wet Acid (PWA) (WPA purified by solvent extraction). Any of these three types of phosphoric acid are suitable for use in the claimed invention. WPA is the preferred type of acid because it is relatively inexpensive.

Those skilled in the art often breakdown WPA into two types of wet acid: black acid and green acid. Black acid is produced by reacting phosphate rock and sulfuric acid. Because the phosphate rock contains organic impurities it imparts a black color to the resulting phosphoric acid, hence the name. Green acid, on the other hand, is produced by first burning the phosphate rock to reduce the organic impurities before reacting the rock with sulfuric acid. The remaining impurities impart a green color to the resulting phosphoric acid. Either type of wet acid may be used to practice the claimed invention. Individual impurity tolerance levels, cost considerations and aesthetic preferences dictate which wet acid should be selected for use in the claimed invention.

Impurities contained in the phosphoric acid may adversely affect the performance of the claimed invention. For example, Spent Phosphoric Acid (SPA) is not suitable for use in the claimed invention. SPA is generated as a by-product of the aluminum finishing industry which uses phosphoric acid to polish aluminum. As such, SPA contains a number of impurities, one of which is aluminum which dissolves in the phosphoric acid during the polishing process. SPA usually contains 1.0–1.5% aluminum by weight which precipitates out in the oxidation stage as complex aluminum phosphates. Therefore, use of SPA reduces the amount of phosphate available in the wastewater as a bio-nutrient by as much as 10–15%. Accordingly, use of SPA with significant impurities would erode much of the nutrient addition efficiency generated by the claimed invention.

Phosphoric acid of all types is generally available in varying $H_3PO_4$ concentrations. Typical concentrations are 75%, 80%, and 85% $H_3PO_4$. 75% phosphoric acid is the preferred concentration because its low freezing point of −18° C. (versus 5° C. for 80% and 21° C. for 85%) prevents operational complications due to freezing associated with operating in the outdoors during the cold winter months.

The first step in providing supplemental nutrients for biologically treating a wastewater stream is determining the organo-nutrient ratio (ONR). The ONR is the ratio of organic pollutants to nitrogen and phosphorus contained in the wastewater to be treated. The amount of organic pollutant contained in the wastewater is generally measured by the biochemical oxygen demand (BOD) of the wastewater. Industry typically uses $BOD_5$ as the measure of organic pollutants. $BOD_5$ is the quantity of oxygen required by organisms to oxidize organic carbon to carbon dioxide and organic nitrogen to nitrate in a five day period. Although $BOD_5$ is the preferred way to express the degree of organic pollutants contained in the wastewater, any BOD time period may be used. In addition, those skilled in the art will recognize that other measures of organic pollutants may be used such as chemical oxygen demand and total organic carbon.

The basis for determining the amount of nitrogen and phosphorus to add to the wastewater is the desired organo-nutrient ratio (DONR). The DONR is the ratio of nitrogen and phosphorus to organic pollutants, deemed necessary to promote sufficient biosynthesis of microorganisms necessary to breakdown all the organic wastewater pollutants. A typical DONR for optimum treatment efficiency is approximately 100:5:1 when expressed as the ratio of $BOD_5$:N:P. However, 100:5:1 is only a guideline for treatment. The DONR varies from industry to industry and may even vary from plant to plant within an industry. For instance, a typical DONR for wastewater generated from fiberboard production is 100:5:1, but that ratio decreases to 100:4:1 for wastewater generated by papermaking. As reported in Wastewater Biology: The Life Processes, page 34, the text of which is incorporated by reference, the DONR may range from 100:2–8:0.54–2.66 depending on the industry. Other variations among treatment plants such as sludge retention time also affect the DONR. As the sludge age increases the ratio of N:P to $BOD_5$ decreases. Further, other methods for determining the amount of organic pollutants in the wastewater such as chemical oxygen demand and total organic carbon necessarily demand a numerically different ratio. However, all expressions of the degree of organic pollutants have a $BOD_5$ equivalent and the skilled artisan may adapt the ratios of the present invention for use with other means of expressing the degree of organic pollutants.

After determining the amount of organic pollutants, nitrogen and phosphorus contained in the wastewater the deficient nutrient level may be calculated (DNL). The DNL is the amount of nitrogen and phosphorus addition to the wastewater required to bring the wastewater to the DONR. Addition of nitrogen and phosphorus to the wastewater in amounts equal to the DNL results in wastewater with an organic pollutant to nitrogen to phosphorus ratio equal to the DONR and represents the most efficient addition of nutrients capable of promoting sufficient microbial growth to ensure breakdown of all the organic pollutants.

The DNL determines the initial composition of the liquid bio-nutrient to be added to the wastewater. As previously disclosed a mixture with a ratio of deficient nitrogen to deficient phosphorus (N:P), deficient nutrient ratio (DNR), may be created with urea, phosphoric acid and water. While the DNR for the liquid bio-nutrient compositions commonly fall in the range of 10:1 to 1:10, any composition may be created as dictated by the initial nitrogen and phosphorus concentrations of the untreated wastewater.

To facilitate the growth of microorganisms which breakdown organic pollutants, a liquid bio-nutrient containing nitrogen and phosphorus in ratios equal to the DNR is charged into the wastewater. The level of nutrients in the wastewater effluent determines the amount of bio-nutrient added to the wastewater. The charge rate of bio-nutrient may be controlled based on the continued or periodic monitoring of the TKN and ortho-phosphate (ortho-p) concentrations of the wastewater effluent.

Those of ordinary skill in the art recognize that the operational parameters, flow rates, organic loads, and microbial population, among other things, associated with any given wastewater treatment operation continuously fluctuate. Because of the dynamic nature of wastewater treatment operations and the fact that calculations of the DNL and DNR are based on a $BOD_5$ determination which takes 5 days to perform, the calculated DNL and DNR may not accurately reflect the proper ratio necessary to treat the current wastewater flow. Therefore, the wastewater effluent should be monitored for both nitrogen and phosphorus during the initial startup phase utilizing the claimed invention. Those skilled in the art should be able to adjust the nutrient ratio of the claimed composition as needed to eliminate excess nutrient addition while ensuring sufficient availability of nutrients for biosynthesis.

Once the DNR is empirically verified, the ortho-p concentration of the effluent is monitored and used as the control criteria for bio-nutrient addition and the TKN is eliminated as a controlled parameter. However, the TKN should be monitored on a periodic basis, preferably quarterly, to verify that the formulated treatment composition continues to adequately and efficiently address the nitrogen requirements of the wastewater stream.

Although commonly used as the control criteria for phosphorus addition, the ortho-p level becomes an accurate measure of the phosphorus content and an indicator of sufficient nitrogen levels in the wastewater when a liquid bio-nutrient possessing the correct DNR is used to treat the wastewater. The ortho-p concentration of the wastewater effluent should be maintained through controlled addition of the bio-nutrient in the range of 0.0 to 2.0 mg/L. Preferably, the range should be 0.5 to 1.0 mg/L. Most preferably, addition of the bio-nutrient should be controlled to maintain an ortho-p concentration of 0.5 mg/L. Controlling at an ortho-p concentration in the effluent of 0.5 mg/L ensures adequate availability of nitrogen and phosphorus for biosynthesis of sufficient microorganisms necessary to ensure maximum breakdown of all organic pollutants while minimizing not only consumption of the liquid bio-nutrient but the eutrophication problems associated with excess addition of nutrients into the wastewater.

The following examples are not to be construed as limiting the invention as described herein.

EXAMPLES

Example 1

For an industrial wastewater with daily average flow at 10 MG/D containing $BOD_5$ at 250 mg/L with no available nutrients in the influent, the following nutrients are needed with an optimal $BOD_5$:N:P ratio of 100:5:1

Calculation of Deficient Nutrient Level (DNL)
N(deficient), lb/D = N(desired)-N(available)
  N(desired), lb/D = 10,000,000 × 250 × 3.785 ×
  (1/454) × (1/1000) × (5/100)
    = 10 × 8.34 × 250 × (5/100)
    = 1,042.5
  N(available), lb/D = 10 × 8.34 × 0
N(deficient), lb/D = 1042.5 − 0
  = 1042.5
P(deficient), lb/D = P(desired) − P(available)
  P(desired), lb/D = 10 × 8.34 × 250 × (1/100)
    = 208.5
  P(available), lb/D = 10 × 8.34 × 0
P(deficient), lb/D = 208.5 − 0
  = 208.5

Calculation of Deficient Nutrient Ratio (DNR)

DNR=Deficient N:Deficient P=1042.5/208.5=5.0

Using the preferred control strategy of maintaining an ortho-p concentration of 0.5 mg/L in the effluent, the amount of phosphorus left in the wastewater effluent is $$P(excess), lb/D = 10 \times 8.34 \times 0.5$$

$$= 41.7$$

Using the present invention product, a mixture of urea and phosphoric acid solution with N/P at 5/1, (for example, a mixture of the following compositions: urea, 40 wt %; 75% $H_3PO_4$, 15.5 wt %; and water, 44.5 wt %) containing 18.4%N and 3.68% P, the minimum addition is Liquid Nutrient (N/P = 5), lb/D = (P(deficient) + P(excess))/$P_{conc}$ Liquid Nutrient (N/P = 5), lb/D = (208.5 + 41.7)/.0368

$$= 6,798.91$$

The effluent should have TKN at 2.5 mg/L and Ortho-P at 0.5 mg/L. Table III depicts a comparison between use of conventional nutrients and use of a custom formulated bio-nutrient of the claimed invention given the parameters of Example 1. Since the wastewater influent did not contain any nitrogen or phosphorus there is no practical significance between use of the bio-nutrient and conventional nutrients.

TABLE III

Available Nutrients In The Secondary Influent: TKN: 0 mg/L, P:0 mg/L

| | Nutrient Used (pound) | Nitrogen (Pound) | Phosphorous (Pound) | Effluent Nutrient Level |
|---|---|---|---|---|
| Conventional Nutrients | | | | |
| Anhydrous $NH_3$ (@ 81.8% N) | 1641.5 | 1342.7 | | TKN − 1.5 mg/L |
| 75% $H_3PO_4$ (@ 23.7% P) | 1055.7 | | 250.2 | |
| | | | | P − 0.5 mg/L |
| Custom Formulated Bio-nutrient | | | | |
| Bio-nutrient N/P = 5 | 6798.9 | 1251 | 250.2 | TKN − 1.5 mg/L |

TABLE III-continued

Available Nutrients In The Secondary Influent: TKN: 0 mg/L, P:0 mg/L

| | Nutrient Used (pound) | Nitrogen (Pound) | Phosphorous (Pound) | Effluent Nutrient Level |
|---|---|---|---|---|
| (@ 18.4% N, 3.68% P) | | | | P - 0.5 mg/L |

Example 2

For an industrial wastewater as in Example 1 with TKN 8.0 mg/L and Ortho-P 1.1 mg/L as available nutrients in the influent, the following nutrients are needed with an optimal $BOD_5$:N:P ratio of 100:5:1

Calculation of Deficient Nutrient Level (DNL)
  N(deficient), lb/D N(desired) − N(available)
    N(desired), lb/D = 10,000,000 × 250 × (5/100) × 3.8 × (1/454) × (1/1000)
      = 10 × 8.34 × 250 × (5/100)
      = 1,042.5
    N(available), lb/D = 10 × 8.34 × 8.0
      = 667.2
    N(deficient), lb/D = 1042.5 − 667.2
      = 375.3
  P(deficient), lb/D = P(desired) − P(available)
    P(desired), lb/D = 10 × 8.34 × 250 × (1/100)
      = 208.5
    P(available), lb/D = 10 × 8.34 × 1.1
      = 91.7
  P(deficient) = 208.5 − 91.7
    = 116.8

Calculation of Deficient Nutrient Ratio (DNR)
  DNR=Deficient N:Deficient P=375.3/116.8=3.21
Using the preferred control strategy, the amount of phosphorus left in the wastewater effluent is $$P(excess), lb/D = 10 \times 8.34 \times 0.5$$

$$= 41.7$$

Using the present invention product, a mixture of urea and phosphoric acid solution with N/P at 3.21, (for example, a mixture of the following compositions: urea, 35 wt %; 75%$H_3PO_4$, 21 wt %; and water, 44 wt %) containing 16.1%N and 5.0% P, the minimum addition is Liquid Nutrient (N/P = 3.21), lb/D = (P(deficient) + P(excess))/$P_{conc}$ Liquid Nutrient (N/P = 3.21), lb/D = (116.8 + 41.7)/.05

$$= 3,170.0$$

The effluent should have TKN at 1.6 mg/L (3.21×0.5) and Ortho-P at 0.5 mg/L. Table IV demonstrates that use of a custom formulated bio-nutrient provides significant advantages over conventional nutrients when the wastewater influent contains nitrogen and phosphorus as in Example 2. While the phosphorus addition remains the same, the addition of nitrogen is reduced by 61% (510.4 lbs vs. 1342.7 lbs) by using a custom formulated bio-nutrient of the claimed invention. In addition the claimed invention reduces the nitrogen level in the effluent by over 83% (1.6 mg/L vs. 9.5 mg/L).

TABLE IV

Available Nutrients In The Secondary Influent: TKN: 8.0 mg/L, P:1.1 mg/L

| | Nutrient Used (pound) | Nitrogen (Pound) | Phosphorous (Pound) | Effluent Nutrient Level |
|---|---|---|---|---|
| Conventional Nutrients | | | | |
| Anhydrous $NH_3$ (@ 81.8% N) | 1641.5 | 1342.7 | | TKN - 9.5 mg/L |
| 75% $H_3PO_4$ (@ 23.7% P) | 668.8 | | 158.5 | |
| | | | | P - 0.5 mg/L |
| Custom Formulated Bio-nutrient | | | | |
| Bio-nutrient N/P = 3.21 (@ 16.1% N, 5.0% P) | 3170 | 510.4 | 158.5 | TKN - 1.6 mg/L |
| | | | | P - 0.5 mg/L |

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A composition for treating an organic pollutant containing, nutrient deficient wastewater from a paper-making process to provide essential nutrients for biologically degrading the organic pollutant comprising:

urea, phosphoric acid containing less than 1.0% by weight aluminum; and water.

2. A composition for treating nutrient deficient wastewater according to claim 1 wherein the urea provides nitrogen, the phosphoric acid provides phosphorus and the composition contains up to 23 weight percent nitrogen and up to 15 weight percent phosphorus based upon the total weight of the treatment composition.

3. A composition for treating nutrient deficient wastewater according to claim 1 wherein the urea provides nitrogen, the phosphoric acid provides phosphorus and the composition contains about 2–19 weight percent nitrogen and from about 3–12 weight percent phosphorus based upon the total weight of the treatment composition.

4. A composition for treating nutrient deficient wastewater according to claim 1 wherein the urea provides nitrogen, the phosphoric acid provides phosphorus and the composition contains about 13–19 weight percent nitrogen and from about 3–7 weight percent phosphorus based upon the total weight of the treatment composition.

5. A method for treating an organic pollutant containing, nutrient deficient wastewater from a paper-making process to provide essential nutrients for biologically degrading the organic pollutant comprising:

determining the deficient nutrient ratio, formulating a treatment composition containing urea and phosphoric acid in amounts such that the nitrogen and phosphorus content of the composition approximates the deficient nutrient ratio.

6. The method according to claim 5 wherein the deficient nutrient ratio is calculated by determining the desired organo-nutrient ratio and the deficient nutrient level.

7. The method according to claim 5 wherein the deficient nutrient ratio is determined empirically.

8. The method according to claim 6 wherein the range for the desired organo-nutrient ratio is from about 100:2–8:0.54–2.66 when expressed as $BOD_5$ to nitrogen to phosphorus.

9. The method according to claim 6 wherein the desired organo-nutrient ratio is approximately 100:5:1 when expressed as $BOD_5$ to nitrogen to phosphorus.

10. The method according to claim 5 wherein the deficient nutrient ratio is from about 10:1 to 1:10.

11. The method according to claim 5 wherein the treatment composition comprises:

urea, phosphoric acid containing less than 1.0% by weight aluminum; and water.

12. The method according to claim 11 wherein the urea provides nitrogen, the phosphoric acid provides phosphorus and the treatment composition contains up to 23 weight percent nitrogen and up to 15 weight percent phosphorus based upon the total weight of the treatment composition.

13. The method according to claim 12 wherein the urea provides nitrogen, the phosphoric acid provides phosphorus and the treatment composition contains about 2–19 weight percent nitrogen and from about 3–12 weight percent phosphorus based upon the total weight of the treatment composition.

14. The method according to claim 13 wherein the urea provides nitrogen, the phosphoric acid provides phosphorus and the treatment composition contains about 13–19 weight percent nitrogen and from about 3–7 weight percent phosphorus based upon the total weight of the treatment composition.

15. The method according to claim 6 wherein the desired organo-nutrient ratio is approximately 100:5:1 when expressed as $BOD_5$ to nitrogen to phosphorus, the deficient nutrient ratio is from about 10:1 to 1:10, and the urea provides nitrogen, the phosphoric acid provides phosphorus and the treatment composition contains up to 23 percent nitrogen and up to 15 percent phosphorus based upon the total weight of the treatment composition.

16. The method according to claim 6 further comprising adding the treatment composition to the wastewater so that the organo-nutrient ratio of the wastewater approximates the desired organo-nutrient ratio.

17. The method according to claim 16 further comprising monitoring the wastewater effluent for nutrients and adjusting addition of the treatment composition to maintain a desired level of nutrients in the wastewater effluent.

18. The method according to claim 17 wherein the ortho-p level of the wastewater effluent is monitored and used as a basis for determining the level of nutrients.

19. The method according to claim 18 wherein the ortho-p level of the treated effluent is maintained at about 0.0–2.0 mg/ml.

20. The method according to claim 19 wherein the ortho-p level of the treated effluent is maintained at about 0.5–1.0 mg/ml.

21. The method according to claim 20 wherein the ortho-p level of the treated effluent is maintained at about 0.5 mg/ml.

22. The method according to claim 5 further comprising adding the treatment composition to the wastewater.

* * * * *